(12) United States Patent
Tsuboi et al.

(10) Patent No.: US 6,573,623 B2
(45) Date of Patent: Jun. 3, 2003

(54) SLIDING MEANS WITH BUILT-IN MOVING-MAGNET LINEAR MOTOR

(75) Inventors: Takaaki Tsuboi, Kanagawa-ken (JP); Shoji Fujisawa, Kanagawa-ken (JP); Masaki Ohno, Kanagawa-ken (JP)

(73) Assignee: Nippon Thompson Co., Ltd., Tokyo (JP)

( * ) Notice: Subject to any disclaimer, the term of this patent is extended or adjusted under 35 U.S.C. 154(b) by 42 days.

(21) Appl. No.: 09/886,050

(22) Filed: Jun. 22, 2001

(65) Prior Publication Data

US 2001/0054851 A1 Dec. 27, 2001

(30) Foreign Application Priority Data

Jun. 22, 2000 (JP) ......................... 2000-188358

(51) Int. Cl.7 ............................................. H02K 41/00
(52) U.S. Cl. ....................................................... 310/12
(58) Field of Search ............................. 310/12, 13, 14; 318/135

(56) References Cited

U.S. PATENT DOCUMENTS

| | | | |
|---|---|---|---|
| 4,701,058 A | * 10/1987 | Mottate | 384/45 |
| 5,003,856 A | * 4/1991 | Fujimura et al. | 83/576 |
| 5,825,104 A | * 10/1998 | Kondo et al. | 310/12 |
| 5,831,352 A | * 11/1998 | Takei | 310/12 |
| 5,907,200 A | * 5/1999 | Chitayat | 310/12 |
| 6,043,572 A | * 3/2000 | Nagai et al. | 310/12 |
| 6,348,746 B1 | * 2/2002 | Fujisawa et al. | 310/12 |

FOREIGN PATENT DOCUMENTS

| | | |
|---|---|---|
| JP | 298946/1989 | 12/1989 |
| JP | 04-071359 | 3/1992 |
| JP | 47239/1996 | 2/1996 |
| JP | 322232/1996 | 12/1996 |
| JP | 266659/1997 | 10/1997 |

* cited by examiner

Primary Examiner—Nestor Ramirez
Assistant Examiner—Judson H. Jones
(74) Attorney, Agent, or Firm—Browdy and Neimark, P.L.L.C.

(57) ABSTRACT

A sliding means with built-in moving-magnet linear is disclosed, which makes it possible to sense accurately a table position with a magnetic sensor element. To this end, a magnetic flux pattern is rectified outside any one N-pole of forward and aft end poles of a field magnet. Position of the table is monitored with a magnetic sensor element arranged on the bed in opposition to the field magnet. Arranged outside the end pole of the field magnet is an auxiliary magnet unlike in polarity and made as small as possible in effect on propulsion exerted on the table. The auxiliary magnet is to rectify the magnetic flux pattern outside the end pole of the field magnet to the same distribution pattern as found at a boundary between the adjacent poles opposite in polarity in the field magnet, thus making it possible to identify the accurate positions of the forward and aft end pole of the field magnet.

16 Claims, 8 Drawing Sheets

SLIDING MEANS WITH BUILT-IN MOVING-MAGNET LINEAR MOTOR

BACKGROUND OF THE INVENTION

1. Field of the Invention

The present invention relates to sliding means that have been extensively used in machines and instruments as diverse as semiconductor manufacturing apparatus, machine tools, industrial robots, conveyors and others. It is more particularly concerned with a sliding means with built-in moving-magnet linear motor, in which an armature winding is arranged in a stationary bed while a field magnet is installed in a moving table.

2. Description of the Prior Art

In recent years, multi-axis stages and moving mechanisms employed in the diverse technical fields as described above have required more and more sliding means, which are compact or slim in construction and light in weight, and moreover able to operate with high propulsion, high speed and high response to provide high speed travel and accurate position control for works, tools, articles and instruments. Linear motors commonly used in the sliding means involve two broad types. The first, called moving-coil linear motor, has a stator of field magnet mounted on a stationary bed, and moving-armature windings arranged on a table movable lengthwise of the bed in sequence one after another such that they lie a preselected phase angle. The second, called moving-magnet linear motor, has a stator of armature windings arranged lengthwise over the entire length of a bed, and a moving-field magnet of permanent magnet arranged on a table movable in a sliding manner along the length of the bed.

Japanese Patent Laid-Open No. 322232/1996 discloses a linear motor installed in a knitting machine to drive a knitting needle in reciprocating motion. The liner motor is comprised of a plurality of built-in moving-coil liner motor units each of which has a moving assembly composed of a backing plate made therein a window, a resilient sheet member fixed on any one side of the backing plate with adhesive, and exciting windings, for example three windings, arranged on any one surface of the sheet member in a manner to be partly accommodated in the window. The exciting winding is made in the form of flat ellipse where the axial direction of the winding extends thickness-wise of the linear motor unit. The moving assembly is arranged for linear movement between stator assemblies confronting one another, each of which is composed of a backing plate made of ferromagnetic material such as steel, and a plurality of permanent magnet, for example six pieces arranged on the backing plate in juxtaposition along the traveling direction of the moving assembly. The construction in which the exciting windings are accommodated in the associated window in the backing plate reduces the overall thickness or height of the moving assembly. Linear displacement-measuring means is composed of a linear scale extending along the moving direction of the moving assembly, and a sensor head installed on any one of the confronting stator assemblies.

A dc linear motor is disclosed in Japanese Patent Laid-Open No. 47239/1996, in which any one of forward and aft end poles in the field magnet is made insensitive to a pole discriminating element. With the do linear motor recited just above, a moving table is provided on the underside thereof with a magnet yoke, underneath which a field magnet is arranged in opposition to primary armature windings mounted on a stationary bed. The field magnet is made in the form of rectangle in which unlike poles or N-, S-poles are arranged alternately along the fore-and-aft direction thereof. Any one of the forward and aft end poles is made insensitive at a surface opposing to a Hall-effect element to discern the end of the field magnet for monitoring a position of the moving table. This makes it possible to reduce a deviation in number of the coil sides of the armature windings, which might contribute to really generating propulsion, thus realizing the steady propulsion.

A moving-magnet brushless dc linear motor is disclosed in Japanese Patent Laid-Open No. 298946/1989, in which a semiconductor rectifier is arranged for each coil, and two sets of three-phase coil groups are arranged to provide a linear motor of three-phase conduction system.

A sliding means adapted to be used for machine tools and industrial robots is disclosed in Japanese Patent Laid-Open No. 266659/1997, which is a senior copending application of the present applicant. The prior sliding means includes a driving source made of an electromagnetic linear actuator and a built-in moving-magnet uniaxial linear motor to control with precision a position of a driven article. With the prior sliding means cited just above, an electromagnetic linear actuator is arranged between a moving table and stationary bed of steel or magnetic material and at least any one of the table and the bed is constructed to serve a part of magnetic circuit of the electromagnetic linear actuator, concretely the function of either magnet yoke or coil yoke. The prior sliding means has no need of providing separately yokes for establishing magnetic circuit, which might make the sliding means bulky, thus reduced in the number of parts required, and made inexpensive in production cost and slim in construction.

The sliding means disclosed in the above Japanese Patent Laid-Open No. 266659/1997 will be explained below, with referring to FIGS. 18 and 19. A sliding means 51 with an built-in linear motor is composed of a stationary bed 52 and the moving table 53, both of which are made of magnetic material such as steel to serve the function of magnetic circuit, or magnet yoke and coil yoke, thereby rendering the linear motor small or compact in size. The sliding means 51 with built-in linear motor has the stationary elongated bed 52, and the moving table 53 mounted on the bed 52 for linearly reciprocating movement lengthwise of the bed 52 by virtue of linear motion guide units 54. The linear motion guide units 54 are comprised of two track rails 55 arranged on the bed 52 in parallel with each other, and four sliders 56 fitting over the associated track rail 55 for sliding movement. In the linear motion guide units 54, load raceway areas are provided between confronting raceway grooves, one of which is formed on lengthwise sides of the track rails 55 while the counterpart is formed on the sliders 56. The sliders 56 are allowed to move with smooth along the track rails 55 as rolling elements run through the load raceway areas. The table 53 is bored with holes 58 through which screws fit to fix a work on the table 53.

An end block 61 and a connector block 62 are secured to the lengthwise opposing ends of the bed 52, each to each end, with fixing bolts 63, 64 to define a tolerable range of operating stroke of the table 53. The bed 52 is made with holes 65 through which bolts 66 fit to anchor the bed 52 to a platform.

An armature 70, which is a primary side of the sliding means 51, is comprised of a coil board 71 and eight pieces of armature windings 72 arranged on the underside of the coil board 71 in juxtaposition along the moving direction of the table 53. The bed 52 is recessed lengthwise at 73 on the upper surface thereof, where the armature 70 is accommodated through an insulating film 74. Hall-effect elements 75 are arranged on the coil board 71 in conjunction with the armature windings 72, each to each winding. The Hall-effect elements 75 are to issue a signal in response to an amount of magnetic flux created by a secondary field magnet 90, which is detected when the field magnet 90 approaches the Hall-effect elements 75. Excitation of the armature windings 72 is controlled depending on the signal issued out of the Hall-effect elements 75. The armature 70 is jointed to the bed 52 by means of machine screws 76 fitting through spacers 77, which make abutment at their opposing ends against both the bed 52 and the coil board 71 at locations offset widthwise of the bed 52 between any two adjacent armature windings 72 from one another.

The bed 52 is also made with a recess 79 at the underside opposite to the upper recess 73. A driving board 80 is received in the lower recess 79 through an insulating film 81. The driving board 80 is to apply electricity to the armature windings 72, and mounted with a driving circuit 82 composed of diverse electronic components. The driving board 80 is connected with the coil board 71 via connectors 83, 84 extending through a hole 85 bored vertically through the bed 52. In addition, the lower recess 79 in the bed 52 is closed with a cover 86.

The field magnet 90, which is the secondary side of the linear motor, is installed in a recess 92 formed in the table 53 and secured to the underside of the table 53. The field magnet 90 is composed of platy magnets 91 arranged such that unlike poles or N-, S-poles on the platy magnets 91 alternate along the moving direction of the table. The table 53 mounted with the platy magnets 91 provides a magnet yoke forming a part of magnetic circuit, while the bed 52 provides a coil yoke for each armature winding 72, which also forms a part of magnetic circuit. When each armature winding 72 carries the preselected current, a thrust force is created between the primary and secondary sides on the basis of Fleming's rule to drive the table 53 integral with the secondary field magnet 90 with respect to the bed 52 in a sliding manner by virtue of the linear motion guide units 54.

To determine the reference position of the table 53 with respect to the bed 52, a Hall-effect element 97 is installed inside the second armature winding 72 from the left. The reference position may be identified by a signal issued at a time when the Hall-effect element 97 has detected the leftmost platy magnet 91 in the field magnet 90. Besides, two Hall-effect elements 98, 99 are attached to the coil board 71 inside the leftmost and rightmost armature windings 72, each to each winding, to provide limit sensors that ensure keeping the table 53 from travelling over the tolerated range of moving stroke. Each Hall-effect element 98, 99, when the table 53 has traveled over the tolerated range of the operating stroke, may respond to any associated pole at the leftmost and rightmost extremities of the field magnet 90 to issue a signal reporting the accidental event where the table has run away from the desired stroke. In order to monitor the relative location of the table 53 to the bed 52 in the sliding means 51, the table 53 is provided at one lengthwise side thereof with a magnetic linear scale 95 in which unlike magnetic poles (N-, S-poles) are arranged alternately with a fine pitch along the moving direction of the table 53, while the bed 52 has a sensor head 96 responsive to the magnetic scale 95.

In the sliding means 51 with built-in linear motor constructed as stated earlier, there is employed a system in which electric conduction is controlled every each armature winding 72 and, therefore, both the driving board 80 and the driving circuit 82 are built in underneath the bed 52. This system makes the sliding means complicated and bulky in construction. Besides, the linear scale is made of magnetic scale.

Modern advanced machinery and instruments such as semiconductor manufacturing machines, measuring instruments, assembly machines, and so on much desire sliding means that is able to operate accurately with high speed, thereby providing a position control mechanism suitable for clean room and high in propulsion, operating speed and responsibility, with even more compact as compared with the conventional sliding means.

By the way, in conventional sliding means with built-in moving-magnet linear motor in which a table is arranged on a bed for sliding movement through the linear motion guide units, the construction has been employed in which the current flowing through the armature winding installed in the bed interacts with magnetic flux created by the field magnet on the table to generate an electromagnetic force to drive the field magnet together with the table relatively to the bed, and a magnetic detector element such as Hall-effect IC, and so on is mounted on the bed to monitor the field magnet arranged on the table, thereby to control a relative position of the table to the bed. The provision of a magnet only for the position control causes the increase of production cost. Consideration has been thus given to getting the field magnet for table propulsion to function as the magnet for position control.

Nevertheless, in the field magnet in which unlike poles are arranged alternately along the moving direction of the table, magnetic flux distribution is kept closely concentrated between any two adjacent poles opposite in polarity, but at, the forward and aft end poles is diverged outwardly of field magnet. For instance, a position where the lengthwise field density is zero swerves much outwardly of the forward and aft end poles of the field magnet. This means that the magnetic detector element could not sense the accurate positions of the forward and aft end poles. To cope with this, it has been needed to rectify the magnetic flux created at the end poles to make it possible to identify the positions of the forward and aft end of the field magnet with as same accuracy as in the detection of a boundary between the adjacent poles opposite in polarity in the field magnet.

SUMMARY OF THE INVENTION

The present invention has as its primary object to overcome the subject stated earlier and more particular to provide a sliding means with built-in moving-magnet linear motor, in which a magnetic sensor element is allowed to sense accurately a position of any end pole of a field magnet with no provision of an extra magnet only for the position control. To this end, the present invention contemplates to rectify a distribution pattern of magnetic flux created at any one end pole of the field magnet, which is commonly rendered N-polar in light of most current magnetic sensor elements designed to sense N-pole, to the same distribution pattern as found at a boundary between the adjacent poles opposite in polarity in the field magnet.

The present invention relates to a sliding means with built-in moving-magnet linear motor, comprising a bed constituent one of paired members arranged for sliding movement relatively of each other, a table constituent another of the paired members, which is arranged movable lengthwise of the bed in a sliding manner with respect to the bed, a field magnet having unlike magnetic poles juxtaposed alternately in polarity in a moving direction of the table, an armature winding assembly having armature windings installed on the bed in opposition to the field magnet, a magnetic sensor elements installed on the bed in opposition to the field magnet to monitor a strength and direction of magnetic flux, and an auxiliary magnet arranged adjoining to any one of forward and aft magnetic end poles of the field magnet and magnetized in a polarity unlike the associated end pole, wherein a current in each armature winding interacts with magnetic flux created by the field magnet to produce an electromagnetic force to render propulsion to the field magnet to drive the table with a desired position control, and the auxiliary magnet makes up for the magnetic flux at the end pole of the field magnet, thereby making the magnetic sensor element detect an accurate position of the field magnet.

With the sliding means constructed as recited earlier, the electric current existing in the armature windings interacts with the magnetic flux created in the field magnet to generate the electromagnetic force to provide the propulsion driving the table with respect to the bed.

In an aspect of the present invention, a sliding means is disclosed, wherein the auxiliary magnet serves to rectify the strength and direction of the magnetic flux outside a boundary of the end pole of the field magnet to the roughly same strength and direction as the magnetic flux found at a boundary between any two adjacent magnetic poles in the field magnet.

The magnetic sensor element installed on the bed in opposition to the field magnet detects the strength and direction of the magnetic flux created by the field magnet, controlling the electric current in the armature windings to thereby drive the table in a sliding manner to a desired position. The auxiliary magnet serves to rectify the magnetic flux pattern at the end pole of the field magnet, which might otherwise deviate outwardly, thereby providing the same strength and direction as in the magnetic flux found at a boundary between any two adjacent magnetic poles in the field magnet. This makes it possible to sense any end pole of the field magnet with the same accuracy as at the boundary between the two adjacent poles in the field magnet.

In another aspect of the present invention, a sliding means is disclosed, wherein both the bed and the table are made of steel of ferromagnetic material. As a result, the bed may serve as a coil yoke while the table may serve as a magnet yoke, for the sake of which the linear motor comprised of the armature winding assembly and the field magnet may be made compact or slim in overall construction, with even highly efficient electromagnetic reaction. Moreover, the field magnet is made of rare earth magnet such as neodymium or the like and has therein the magnetic poles of a multiple of 4, which are juxtaposed alternately in polarity. The field magnet stated just earlier is effective in raising flux density, thereby providing high propulsion (=current×flux density). This makes it possible to ensure much high-speed movement, responsibility and accurate position control.

In another aspect of the present invention, a sliding means is disclosed, wherein the armature windings are divided into at least two winding groups, each of which includes three armature windings carrying each phase current for three-phase conduction system, and the total number of the armature windings is at least the number of the magnetic poles in the field magnet. According to the sliding means stated just above, there is no need of providing onboard driving circuits underneath the bed as opposed to the prior construction in which conduction systems are individually prepared for every armature winding. Thus, the driving circuits can be moved from the sliding means to the driver side of driving means. Consequently, the three-phase conduction system in which each armature winding carries each phase current makes it possible to remove the driving circuits from the sliding means to the exterior driver, whereby the sliding means in itself may be reduced in overall height.

In another aspect of the present invention, a sliding means is disclosed, wherein the field magnet has therein four magnetic poles while there is provided six armature windings and the table has a fore-and-aft length that affords to ensure the space for the five magnetic poles. According to the aspect stated above, the sliding means may be made compact or slim in overall construction, with even ensuring the traveling range needed in the practical sliding means.

In a further another aspect of the present invention, a sliding means is disclosed, wherein the auxiliary magnet is made less in width in the sliding direction than a width of a coil side of the armature winding to reduce any effect on propulsion rendered to the table. As will be apparent to those skilled in the art, the electric current in the coil sides of the armature winding creates magnetic flux, which in turn interacts with magnetic flux generated by the field magnet to produce the propulsion to force the table. Thus, the auxiliary magnet made less in width in the sliding direction than a width of a coil side of the armature winding is effective to minimize the influence owing to the interaction of the armature windings with the auxiliary magnet on the propulsion given to the table from the field magnet.

In another aspect of the present invention, a sliding means is disclosed, wherein the table is provided with an origin mark to define an origin of the table, and a sensor magnet arranged adjoining to the magnetic end pole fore-and-aft opposite to the auxiliary magnet and magnetized in a polarity unlike the associated magnetic end pole, while the bed is provided with an origin sensor to detect the origin mark, and the armature winding assembly is mounted with a before-the-origin sensor to respond the sensor magnet at a before-the-origin position just before the origin sensor detects the origin during a linear movement of the table along the bed, and a limit sensor to respond any one of the magnetic end pole and the sensor magnet when the table reaches any dead end position of a tolerated stroke range.

As the forward and aft end poles of the field magnet are unlike in polarity, the limit sensors and the before-the-origin sensor should be necessarily set to respond the unlike polarities. Although any one end pole corresponds to any one of the limit sensors, another end pole is unlike in polarity so that there is no need of the polarity setting stated just above. As opposed to the above, the sensor magnet of unlike polarity is provided. Thus, both the limit sensors and the before-the-origin sensor detect the sensor magnet thereby making it possible to control the table in its position and traveling stroke.

In another aspect of the present invention, a sliding means is disclosed, wherein the sensor magnet is arranged outside the field magnet and made less than and equal in length to a half the field magnet to reduce the effect on the propulsion exerted on the field magnet. In order to keep negligibly small the effect of the sensor magnet on the propulsion exerted to the table, consideration must be given to the shape of the sensor magnet and the relative location of the sensor magnet to the field magnet.

In a further aspect of the present invention, a sliding means is disclosed, wherein the sensor magnet is made of ferrite magnet. Compared with the rare earth magnet, ferrite magnet is weak in magnetic force and, therefore, the adverse effect on the propulsion exerted to the table may be made less.

In another aspect of the present invention, a sliding means is disclosed, wherein the auxiliary magnet is magnetized in S-pole, the magnetic pole adjacent to the auxiliary magnet is in N-pole, while the sensor magnet is magnetized in N-pole and the magnetic pole adjoining to the sensor magnet is magnetized in S-pole. Thus, the magnetic sensor element can read the position of the table.

In another aspect of the present invention, a sliding means is disclosed, wherein an encoder to monitor a position of the table in the sliding direction with respect to the bed is an optical encode, which is comprised of an optical linear scale arranged on the bed and a sensor installed on the bed in opposition to the optical linear scale to read the optical linear scale. The optical encoder, since tough to be affected by the relative changes of the sensor with the scale, is preferred for highly accurate requirements. Moreover, selection of the optical encoder rather than the magnetic encoder contributes to improvement in resolution, ensuring highly accurate position control. The optical linear scale of the optical encoder is arranged on the underside of the table while the sensor element to read the linear scale is installed in the bed. Thus, there is no sensor cord or line moving in conjunction with the travel of the table. The construction is effective in keeping the sliding means itself low in the occurrence of dust and dirt, thus realizing clean environment.

In another aspect of the present invention, a sliding means is disclosed, wherein the magnetic sensor elements are Hall-effect ICs arranged in the armature windings, each to each winding. These magnetic sensor elements or Hall-effect ICs are available at considerably inexpensive cost and easily arranged in place by assembling together at the time of fabricating the armature winding.

In another aspect of the present invention, a sliding means is disclosed, wherein the table is provided with an end plate at a position adjoining the auxiliary magnet to keep the magnetic flux established in the field magnet against leakage. As the end plate keeps the magnetic flux established in the field magnet from leakage out of the associated end of the table, anything approaching the table may be protected against magnetic affection.

In a further another aspect of the present invention, a sliding means is disclosed, wherein the armature windings are accommodated in a recess cut in the bed along the sliding direction of the table, and linear motion guide units are interposed between the confronting table and bed and arranged on widthwise opposing sides of the recess along the moving direction of the table. The armature windings are accommodated in the recess cut in the bed. Thus, the bed may be made as thin in height as possible so that the sliding means is made much slim in overall height. The linear motion guide units arranged spaced across the recess in parallel along the sliding direction of the table help ensure steady travel of the table with respect to the bed. The field magnet is allowed to fit in a clearance that is left between the widthwise-opposed linear motion guide units interposed between the confronting table and bed. Besides, the encoder may be arranged on the bed and the table outside any one of the linear motion guide units.

In another aspect of the present invention, a sliding means is disclosed, wherein the armature windings are mounted on a coil board to cover the recess, so that the armature windings are arranged in a flat form that is fitted snugly in the recess. The armature winding assembly composed of the coil board and flat armature windings is made as thin as possible in thickness to be able to fit in the recess cut in the bed. Each the armature winding is composed of turns wound in the form of rectangle and a resinous core molding the turns therein. The core of molded resin serves well to preserve the shape of the armature winding.

In another aspect of the present invention, a sliding means is disclosed, wherein the bed has an end block at any one of the forward and aft ends thereof, and has a connector block at another of the forward and aft ends, the connector block having an electric power cord to be connected to the armature windings and a sensor line to be connected to the sensor element of the encoder, and elastic stoppers are mounted on the blocks, each to each block, to buffer collision with the table. If the table were moved beyond the tolerated stroke range with respect to the bed, the elastic stopper inside the end block or the connector block would buffer the collision with the table to protect the sliding means against breakage.

With the sliding means constructed as stated earlier, the auxiliary magnet behaves in a manner that rectifies the flux pattern created outside the magnetic end pole of N-pole in the field magnet to the same flux pattern as found at the boundary between the adjacent poles opposite in polarity in the field magnet, thus making it possible to identify the accurate position of the table with respect to the bed.

The sliding means of the present invention, therefore, helps ensure the improvements in much high-speed movement, responsibility and accurate position control of the table with respect to the bed. According to the present invention, moreover, there is no need of providing a magnet only for the position control and the detection of the table position can be realized by relying instead on the existing field magnet and magnetic sensor element. This results in lowering the production cost. In addition, the sliding means of this invention, as being made as compact as possible in size, realizes space saving in production, storage, conveying, installation and use thereof, making for an improvement in working environment, and further providing position control mechanism that is suitable for clean room and high in propulsion, operating speed and responsibility.

BRIEF DESCRIPTION OF THE DRAWINGS

In FIG. 12, there are shown deviations (A, B, C) at the Hall-effect ICs arranged for phases U, V and W of a three-phase current, each to each phase, when the auxiliary magnet is 3 mm in width;

in FIG. 13, there are shown deviations ($A_0$, $B_0$, $C_0$) at the Hall-effect ICs for phases U, V and W of a three-phase current, with the auxiliary magnet of 5 mm in width; and in FIG. 14, there are shown deviations ($A_1$, $B_1$, $C_1$) at the Hall-effect ICs for phases U, V and W of a three-phase current, with no auxiliary magnet:

DETAILED DESCRIPTION OF THE PREFERRED EMBODIMENTS

Preferred embodiments of a sliding means with built-in moving-magnet linear motor according to the present invention will be explained hereinafter in detail with reference to the accompanying drawings.

Figure 1:
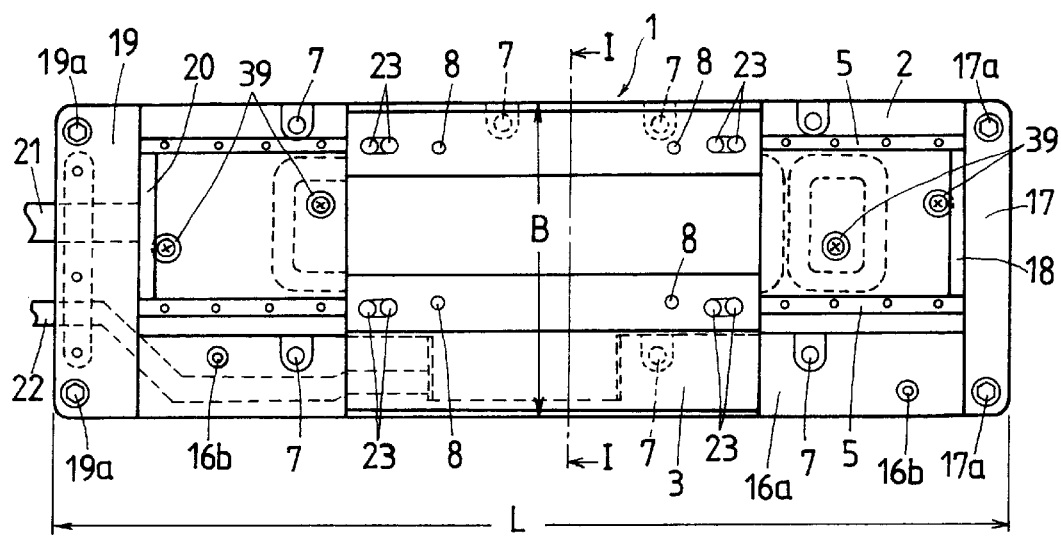
FIG. 1 is a top plan view showing a preferred embodiment of a sliding means with built-in moving-magnet linear motor in accordance with the present invention.
Figure 2:
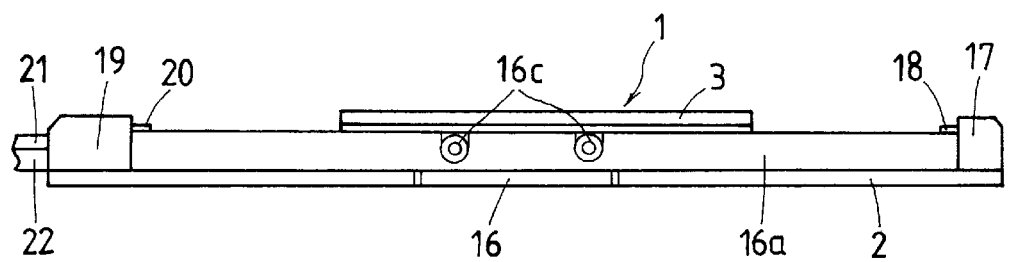
FIG. 2 is a front elevation of the sliding means shown in FIG. 1.
Figure 3:
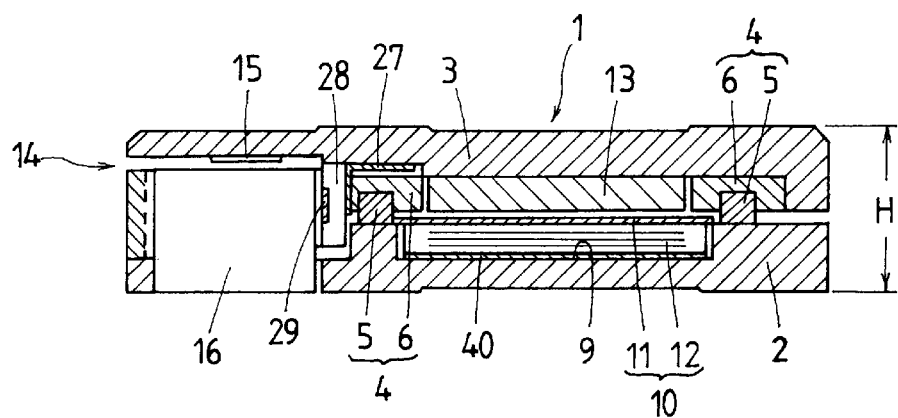
FIG. 3 is a cross-sectional view of the sliding means, taken along the plane I—I of FIG. 1.

Referring to FIGS. 1 to 3, a sliding means 1 with built-in moving-magnet linear motor of the present invention is mainly comprised of an elongated steel bed 2 of rectangular shape secured usually to any stationary machine or instrument, not shown, and a steel table 3 of rectangular shape mounted on the bed 2 for linearly sliding movement lengthwise of the bed 2. On the elongated bed 2 there are mounted linear motion guide units 4, which are composed of a pair of track rails 5 secured to the bed 2 with fixing screws so as to extend lengthwise of the bed 2 in parallel and in flush with one another, and sliders 6 fitting over and conforming to the track rails 5, two sliders to each rail, for sliding movement relatively of the track rails 5. The table 3, since affixed to the sliders 6 of the linear motion guide units 4, is allowed to travel as the sliders 6 run along the track rails 5. The table 3 is fastened on the sliders 6 with screws 23 drilled into the sliders 6 to the extent where the tops of their screwheads are buried into below the top surface of the table 3. With the present sliding means 1, the bed 2 is made with holes 7 through which bolts stretch to clamp the bed 2 together with any stationary base, while the table 3 is bored with threaded holes 8 into which screws are driven to secure any part or component such as work thereon, which is moved under accurate speed and position control. The sliding means is, as shown in FIG. 2, made in a flat construction reduced in overall height.

The linear motion guide units 4 are each comprised of, for example any one of the paired track rails 5 and the slider 6 sitting astride the associated track 5. Each slider 6 has, for example, a casing, a pair of end caps attached on froward and aft ends of the casing respectively, and end seals mounted on the outer surfaces of the end caps. The casing is made with raceway grooves confronting raceway grooves on widthwise-opposing, lengthwise-extending sides of the track rails 5. The confronting raceway grooves define between them parts of recirculating passages through which rolling elements contained therein are allowed to run in a row. The recirculating passages consist of load raceway grooves formed in the casing to define load raceways in conjunction with the raceway grooves on the track rails, return passages formed in the casing and turnarounds formed in the end caps to connect the load raceways with the return passages. Thus, the sliders 6 are allowed to move with smooth on and along the track rails 5 as the rolling elements in the recirculating passages run through the load raceways defined between the casing and the track rails.

As seen from FIG. 3, the bed 2 of the sliding means 1 is made on the upper surface thereof with a recess 9 extending between the widthwise-opposing linear motion guide units 4 along the moving direction of the table 3. Snugly fitted in the recess 9 is an armature assembly 10 of stator side, which is comprised of a coil board 11 and armature windings 12 affixed to the coil board 11. Mounted underneath the table 3 in opposition of the armature assembly 10 is a moving element of a field magnet 13 made of rectangular permanent magnets arranged such that unlike poles alternate in juxtaposition along the moving direction. A linear motor is built in the sliding means 1, in which a three-phase current flowing through armature windings 12 interacts with a magnetic flux created by the field magnet 13, generating an electromagnetic force to drive the table 3 along the bed 2 in a sliding manner towards a desired position. Control means and driver means for the control means and a power source are installed outside the sliding means 1.

Figure 4:
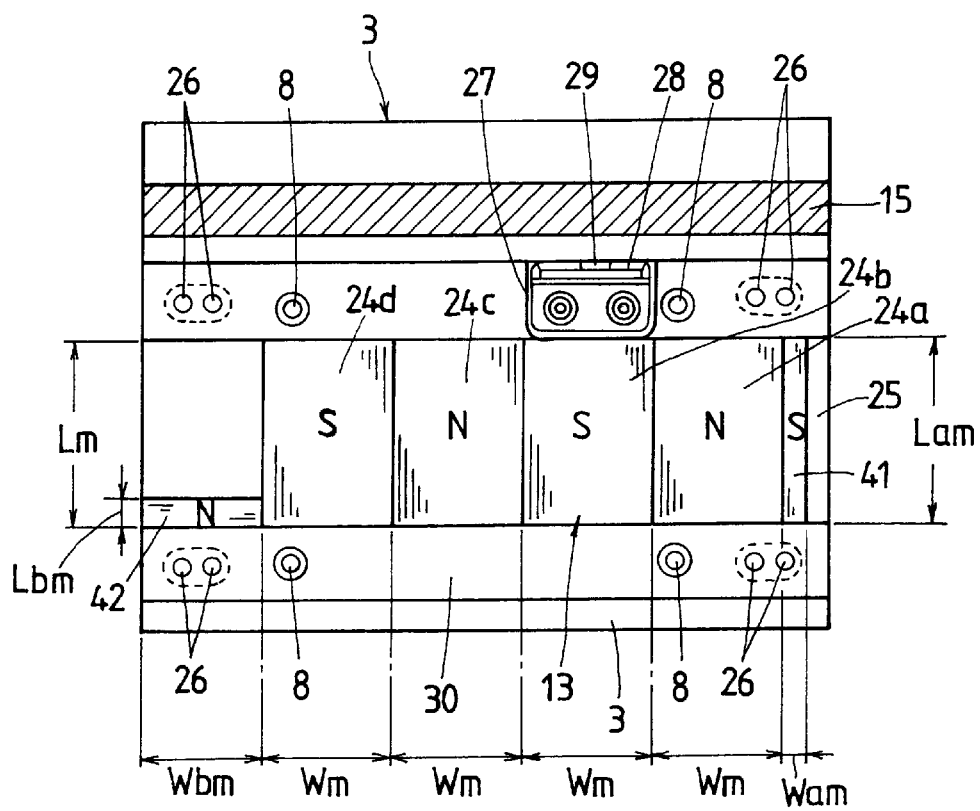
FIG. 4 is a rear elevation of a moving table used in the sliding means of FIG. 1.

As seen from FIGS. 3 and 4, the sliding means 1 has an optical encoder 14 for monitoring a position of the table 3 with respect to the bed 2. The optical encoder 14 is composed of an optical linear scale 15 arranged along the moving direction of the table 3 underneath the table 3, and a sensor element 16 fitted in the bed 2 about midway of the bed 2 in opposition to the optical linear scale 15. Referring again to FIGS. 1 and 2, the sensor element 16 is mounted on an elongated block 16a with fixing bolts 16c, which is attached to any one lengthwise side of the bed 2 by fastening screws 16b.

With the sliding means 1 shown in FIGS. 1 and 2, there is provided an end block 17 serving as a limiter to keep the table 3 from shooting outside the end of the bed 2 owing to the movement beyond the tolerated range of operating stroke. The end block 17 is fixed to any one of the lengthwise opposing ends of the bed 2 by tightening fixing means such as bolts 17a with internal hexagonal-socket head. The end block 17 is also mounted on a side thereof facing the table 3 with a stopper 18 of elastic body such as urethane rubber. A connector block 19 is attached to another end of the bed 2 by means of the same fixing means 19a as in the end block 17. Besides serving as a limiter to keep the table 3 from shooting outside the end of the bed 2 owing to the movement beyond the tolerated range of operating stroke, the connector block 19 may serve to guide an electric power line for supplying electric power to the armature windings 12 to energize the linear motor, a signal line 21 for the sensor elements including a limit sensor, a before-origin sensor (refer to FIG. 6) and so on, and a sensor cord 22 for delivering a signal monitoring a position of the table 3 relatively to the bed 2 at an origin mark, optical encoder 14, and so on. The sensor cord 22 is connected to a controller unit, which is to supply electric power for energizing the linear motor through the signal line 21 and electric power line, depending on position information issued via the electric power line, signal line 21 and sensor cord 22. The connector block 19 is also mounted on a side thereof facing the table 3 with a stopper 20 of elastic body of urethane rubber. These stoppers 18, 20 provide buffers for protecting the slider 6 from a collision that might occur when the slider 6 comes close to the limit of its stroke.

Figure 5:
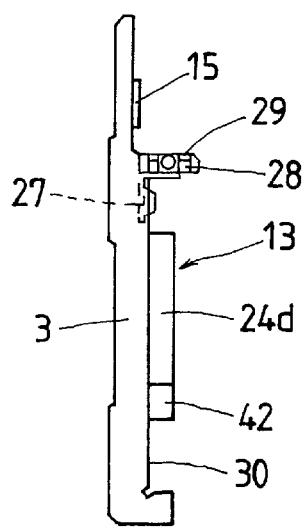
FIG. 5 is a side elevation, viewed from the left side, of the table shown in FIG. 4.

Referring next to FIGS. 4 and 5, there is shown a field magnet 13 attached on an underside 30 of the table 3 and composed of four rectangular poles 24a to 24d, which are arranged in such a manner that unlike poles alternate with each other along the moving direction of the table 3. According to the embodiment shown here, the field magnet 13 is a permanent magnet made of rare earth such as neodymium, and so on. The table 3 is made of magnetic material of steel to serve as a magnet yoke allowing the magnetic flux created by the field magnet 13 to permeate through there. Thus, there is no need of preparing separately the magnet yoke to be attached to the table 3, and therefore the moving element of the linear motor may be made compact or slim in construction.

The field magnet 13 is provided at any one of forward and aft ends thereof with the magnetic end pole 24a of N-pole and an auxiliary magnet 41 is arranged in juxtaposition on the outside of the magnetic end pole 24a. On another end opposite to the magnetic end pole 24a in the field magnet 13, there is provided another magnetic end pole 24d of S-pole, on the outside of which is juxtaposed a sensor magnet 42. A steel-made end plate 25 for the prevention of flux leakage is further arranged on the outside end of the auxiliary magnet 41. The steel-made end plate 25 is to keep the magnetic flux established in the field magnet 13 from leakage out of the forward and aft ends of the table 3, protecting anything approaching the table 3 against magnetic affection. The end plate 25 is equal in width to about half of a width d, for example 5 mm width in FIG. 6, of a coil side of the armature winding 12, which is a winding part that lies in perpendicular to the moving direction of the table 3. The end plate 25 is also equal in thickness to the field magnet 13. As an alternative, the end plate 25 is integrally with the table 3. The fore-and aft optical linear scale 15 is attached to the underside 30 of the table 3 at the lengthwise side thereof opposing to the sensor element 16, while an origin mark 28 is mounted in opposition to the side surface of the sensor element 16 to an L-bracket 27, shown in FIG. 3, neighboring the linear scale 15 in an attitude normal to the underside 30 of the table 3. A magnet is embedded in the center of the origin mark 28 to issue a signal reporting the origin or reference position to the sensor element 16.

Figure 6:
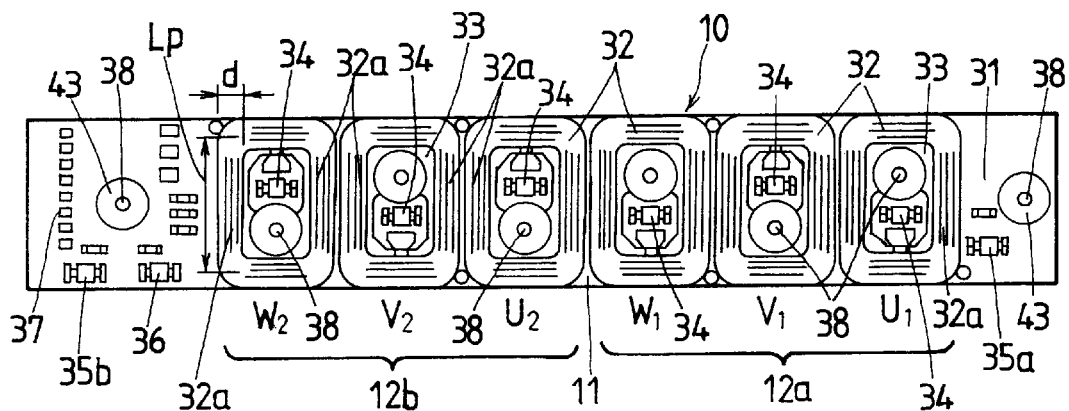
FIG. 6 is a rear elevation showing a coil board incorporated in the sliding means of FIG. 1.
Figure 7:
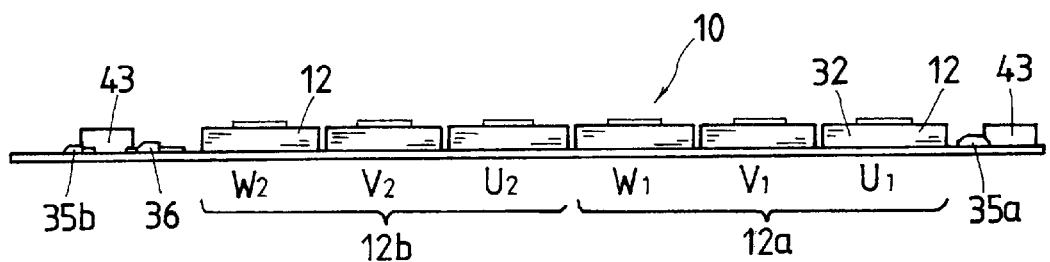
FIG. 7 is a front elevation of the coil board of FIG. 6.
Figure 8:
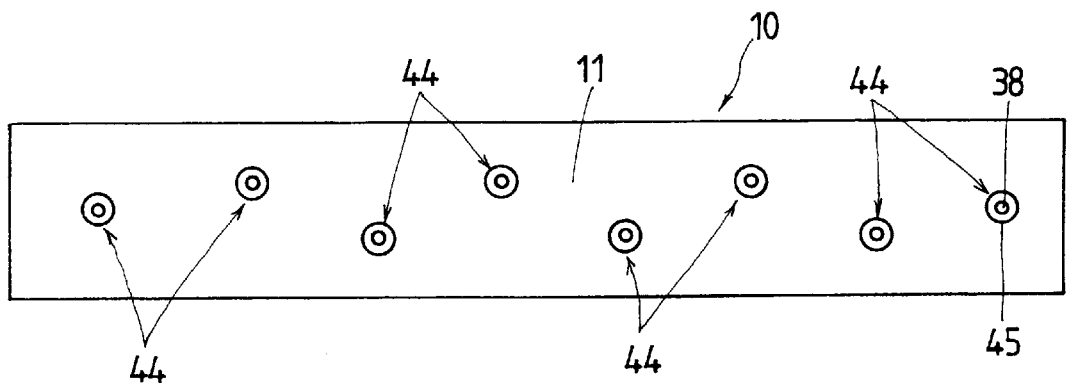
FIG. 8 is a rear plan view of the coil board in FIG. 6.

The armature assembly 10, as shown in detail in FIGS. 6, 7 and 8, is comprised of a coil board 11 of level thin sheet, and six flat armature windings 12 arranged in juxtaposition along the moving direction of the table 3 on the underside 31 of the coil board 11 and secured thereto with adhesive. The six armature windings 12 are divided into two winding groups 12a, 12b each of which includes three armature windings 12 for three-phase conduction system. The armature assembly 10 is accommodated in the recess 9 in the bed 2 in such a relation that the armature windings 12 are arranged in opposition to the field magnet 13. Each armature winding 12 is made in the form of three-phase coreless coil, which includes winding turns 32 looped in the form of rectangle and a core 33 molding the winding turns 32 in resinous material. Hall-effect elements or Hall ICs 34 to detect the magnetic poles, for example N-poles on the field magnet 13 are fixed to the coil board 11 in opposition to the field magnet 13 midway between the forward and aft coil sides of each armature winding 12. The Hall-effect ICs 34 are to detect any specific pole, for example N-pole to identify the position of the field magnet 13, depending on what Hall-effect ICs have detected the specific pole at the beginning when the electric source has been turn on, to thereby issue a detection signal to control the electric current to the armature windings 12 in light of the detected position of the field magnet 13.

A limit sensor 35a to respond to the specific pole 24, or N-pole in this embodiment, of the field magnet 13 is attached to the underside 31 of the coil board 11 at any one of the forward and aft ends thereof in opposition to the field magnet 13. Another limit sensor 35b to respond to the specific pole 24, or N-pole in this embodiment, of the sensor magnet 42 is fixed to another of the forward and aft ends of the coil board 11 in opposition to the sensor magnet 24. In addition, a sensor 36, which will be called "before-the-origin sensor" hereinafter, is arranged nearby just before the limit sensor 35b along the moving direction of the table 3 and attached to the underside 31 of the coil board 11. The limit sensors 35a, 35b serve as detection elements where the N-poles at the forward and aft ends of the field magnet 13 are monitored to keep the table 3 against overrunning the tolerated range. The before-the-origin sensor 36, when approaching the origin of the table 3, serves as a detection element to monitor the N-pole of the sensor magnet 42 arranged at any one of the forward and aft ends of the field magnet 13. The position where the before-the-origin sensor 36 responds to the sensor magnet 42 is just before a position where the sensor 16 embedded in the bed 2 might detect the origin or a magnet 29 built in the table 3 nearby the origin mark 28. Thus, the before-the-origin sensor 36 serves as a detection element for decelerating the table 3 to make the origin mark 28 align with the sensor element 16.

On the underside 31 of the coil board 11, there are formed terminals 37 for wiring a power source line 22 for the armature windings 12 and a signal line 21 for the Hall-effect ICs 34, limit sensors 35a, 35b and before-the-origin sensor 36. Moreover, the coil board 11 is made with holes 38 in which bolts fit to mount the coil board 11 to the bed 2. The coil board 11 constructed as shown in FIGS. 3 and 4 is accommodated in the lengthwise-extended recess 9 in the bed 2, and affixed to the bed 2 by screwing flush bolts 39, shown in FIG. 1, through the holes 38 into the bed 2. Arranged at the forward and aft ends of the coil board 11 are spacers 43, each to each end, having a height equal to the height or thickness of the armature winding 12, for the sake of which the armature assembly 10 may be held steady in the recess 9. As seen from FIG. 8, the coil board 11 is countersunk around the holes 38 on the backside thereof to form recessed seats 45 in which the flush bolts 39 fit snugly.

The bed 2 is made of magnetic material of steel such as, for example ferromagnetic material: S45C so as to serve as the coil yoke for the armature assembly 10. Since there is no need of providing separately coil yokes, the stator side of the linear motor may be made much slim in size. This makes it possible to render the linear motor much compact or slim in construction. Besides, an insulating film 40, shown in FIG. 3, is inserted between the bed 2 and the armature coils 12 placed in the recess 9.

The following explains how the sliding means 1 operates.

As the armature winding 12 carries current, a rotation of magnetic flux is generated around the coil sides 32a of the armature winding 32, which are the winding part that lies in perpendicular to the lengthwise direction of the armature assembly 10. The rotational magnetic flux stated earlier interacts with the magnetic flux that exists always in perpendicular direction across the air gap between the field magnet 13 and the bed 2 serving as the coil yoke. Thus, the armature windings 12 experience a horizontal force according to the Fleming's rule. With the reaction, the moving element of the field magnet 13 is forced to drive the table 3. The current supplied to the armature windings 12 is turned over correspondingly to the direction of the magnetic flux, which is desired in compliance with the moving direction of the field magnet 13. Eventually the table 3 experiences continually the unidirectional propulsion to keep moving linearly in a sliding manner to the desired position. The acceleration control depending on the amount of current is combined with detection of the current position by the optical encoder 14 to realize accurate position control of the table 3 in the sliding direction. Moreover, the driving speed and position control of the table 3 is accomplished by combination of the sliding means 1 with control system including personal computers, sequencers and drivers.

Figure 9:
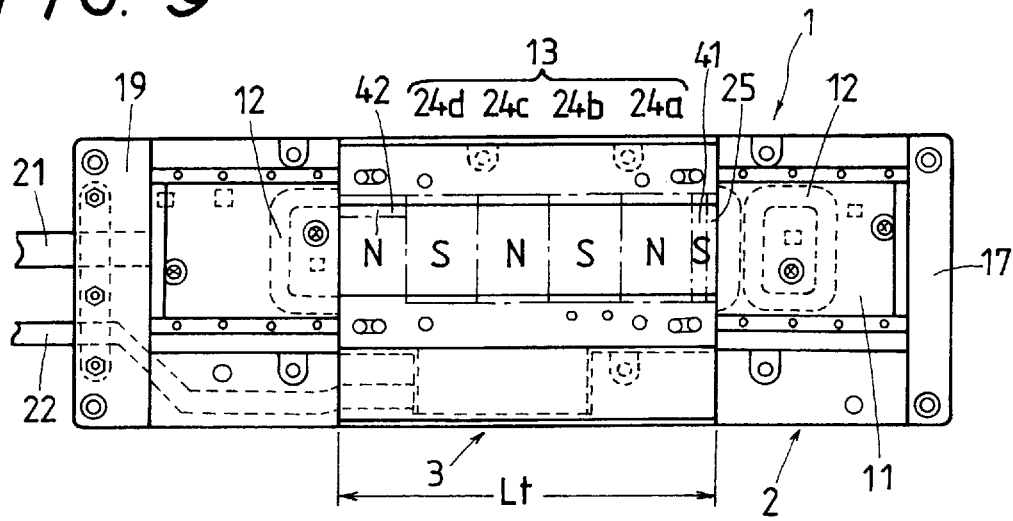
FIG. 9 is a top plan view explaining operational relation among parts and components in the sliding means shown in FIG. 1.

With the embodiment stated earlier, all the Hall-effect ICs 34, limit sensors 35a, 35b and origin sensor 36 are usually designed so as to sense the magnetic pole of N-pole and correspondingly the diverse machines and instruments are also constructed to operate at the time when the N-pole is detected. As opposed to the above, even if all sensors are the type of sensing the S-pole, the following description should be considered reversed about the representation of magnetic polarity. The auxiliary magnet 41, as seen from FIGS. 4 and 9 is arranged on the underside 31 of the table 3 outside the magnetic pole 24a of N-pole in the field magnet 13. The auxiliary magnet 41 has a length Lam extending perpendicularly to the lengthwise direction of the table 3, which is equal to a length Lm of the field magnet 13. The auxiliary magnet 41 is also equal in thickness with the field magnet 13, but smaller in width Wam than a width Wm of any one magnetic pole in the field magnet 13. Besides, the auxiliary magnet 41 is made of a permanent magnet of rare earth such as neodymium, and so on, which is magnetized in S-pole at a surface thereof. The auxiliary magnet 41 of S-pole allows the Hall-effect IC 34 to sense accurately the outermost boundary of the N-pole of the field magnet 13 in such a manner as will be explained below.

Figure 10:
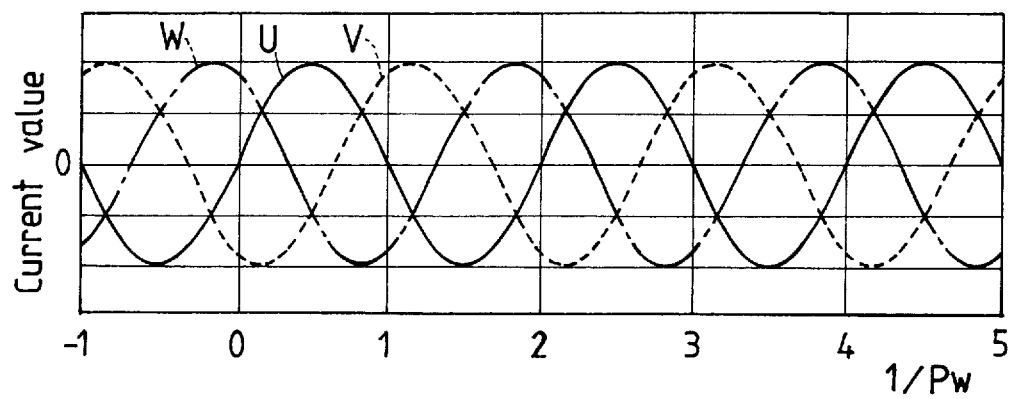
FIG. 10 is a diagram illustrating waveforms of currents changing with time, which are supplied to armature windings.

Referring to FIG. 10 there are illustrated diagrams of current changing with time in the armature assembly 10 of the sliding means 1. The current to the armature assembly 10, as seen from FIG. 10, is a three-phase current of U-, V- and W-phases that are 120° out of phase from each other. The numbers on the abscissa indicate the magnification of a half-wavelength Pw for each phase.

Figure 11:
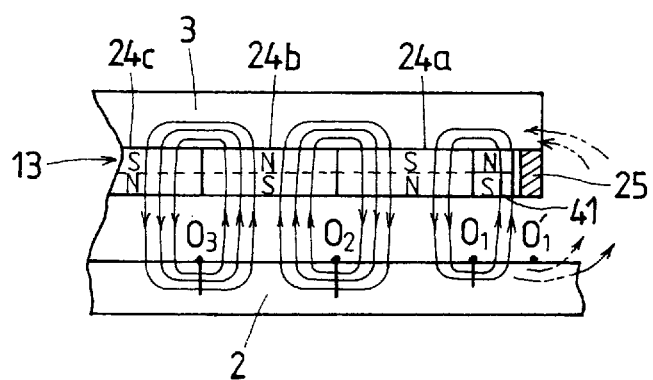
FIG. 11 is a schematic illustration explaining the magnetic relation of an auxiliary magnet with the field magnet in the sliding means.

Referring next to FIG. 11, a boundary between any adjacent unlike magnetic poles alternating in the magnet field 13, for example a boundary between the adjacent magnetic poles 24a and 24b, another boundary between the adjacent magnetic poles 24b and 24c, and so on comes in coincidence to any of positions $O_2$, $O_3$ where a sum of flux components N-pole and S-pole opposite in direction becomes zero. Nevertheless, the magnetic flux at the outermost faces of the forward and aft end poles would be made deviated outwardly, as illustrated with phantom lines, in the prior construction in which there is provided no auxiliary magnet 41, so that the position where the sum of the vertical flux components of N-pole and S-pole becomes zero would shift to a position $O_1'$, shown in FIG. 11, outside the outermost boundary of the associated magnetic pole. This has caused the Hall-effect ICs 34 to identify the malpostion $O_1'$ as the outermost face of the magnetic pole 24a. As opposed to the above, the sliding means 1 of the present invention has the auxiliary magnet 41 of S-pole arranged outside the magnetic pole 24a. As a result, the position $O_1$ where the sum of the N-pole flux components of the magnetic pole 24a and the S-pole flux component of the auxiliary magnet 41 may be kept in alignment with a boundary between the magnetic pole 24a and the auxiliary magnet 41, as with the boundary between the adjacent unlike magnetic poles 24b and 24c.

It is to be noted that the auxiliary magnet 41 has no influence on the propulsion created by the linear motor. Thus, the auxiliary magnet 41 has to be designed so as to make small an area covering over a side 32a of the armature winding 12. To this end, FIGS. 12 to 14 show test results that were achieved as to how the positions (A, B, C) sensed with the Hall-effect IC 34 deviate dependent on variations of the auxiliary magnet 41 in width Wam in the moving direction of the field magnet 13.

Figure 12:
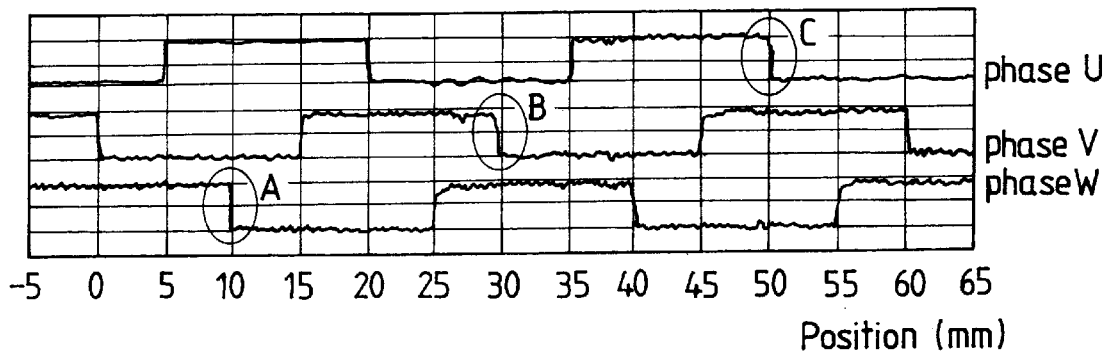
FIGS. 12 to 14 are graphic representations explaining experimental data about deviations in position detected at a Hall-effect IC, depending on variations of the auxiliary magnet in width along the moving direction of the table.
Figure 13:
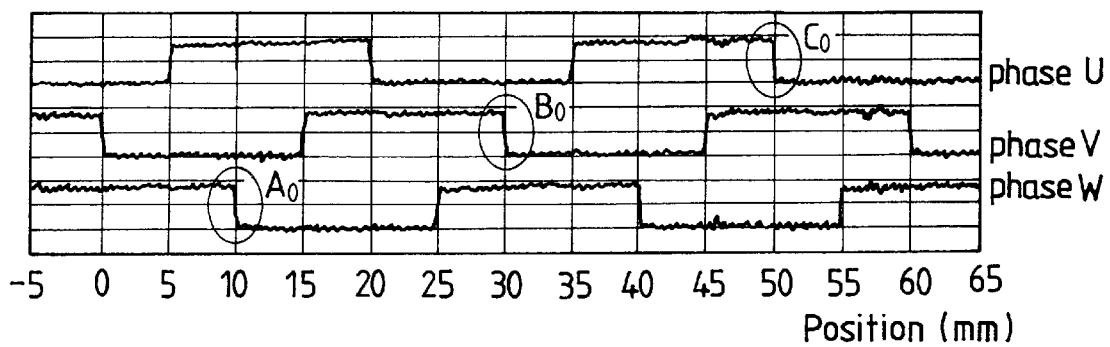
Figure 14:
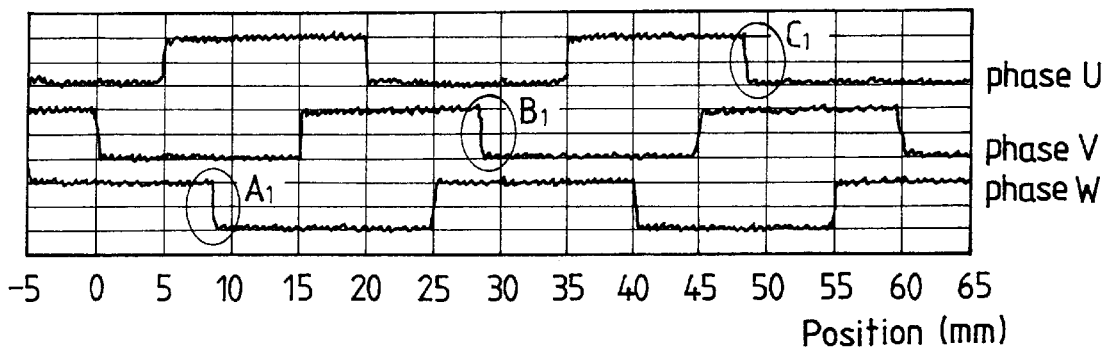

FIG. 12 explains a event where the auxiliary magnet 41 has the width Wam of 3 mm, FIG. 13 is another event where the auxiliary magnet 41 is 5 mm in the width Wam, and FIG. 14 is a further another event where there is provided no auxiliary magnet. In any events stated earlier, there are shown reactions of the Hall-effect ICs arranged for phases U, V and W of a three-phase current, each to each phase. Each Hall-effect IC 34 exhibits a low output when encountering with either of any boundary between the two adjacent magnetic poles or any fore-and-aft end of the field magnet 13, but exhibits a high output when none of the boundary and the fore-and-aft ends is sensed. With the prior construction in which there is provided no auxiliary magnet 41, when the table 3 moved leftwards viewed in FIG. 1, the positions ($A_1$, $B_1$, $C_1$) sensed at every run of the forward-and aft end of the field magnet 13 deviated towards premature sides as shown in FIG. 14. When comparing FIG. 12 with FIG. 13, it will be seen that the position ($A_0$, $B_0$, $C_0$) were well kept coincident in FIG. 13 in which the auxiliary magnet 41 is made larger in width Wam than in FIG. 12. Nevertheless, it was observed that the auxiliary magnet 41 made enlarged in width Wam up to 5 mm had the somewhat negative effect on the prolusion of the linear motor. Therefore, it was turned out in the present invention that the auxiliary magnet 41 of 3 mm in width Wam could provide precise control of the position (A, B, C) as in FIG. 12 with even less effect on the propulsion. According to the testing results stated earlier, it is preferable to make the auxiliary magnet 41 less in width Wam than a width d, about 5 mm, of a coil side 32a of the armature winding 12.

With the sliding means 1 having the auxiliary magnet 41 arranged as stated earlier, the position of the N-pole in the field magnet 13 confronting the Hall-effect IC 34 may be detected at the early time when the electric power source is turned on. Then, a driving current is applied to each of the armature windings 12, depending on the detected position of the field magnet 13. This provides precise position control of the table 3 with respect to the bed 2.

Next, how a sensor magnet operates will be explained.

All the limit sensors 35a, 35b and the before-the-origin sensor 36 are designed to sense the N-pole. The field magnet 13 on the underside 30 of the table 3, as shown in FIG. 9, has an N-pole 24a at any one of the forward and aft ends thereof. The limit sensor 35a responds to the magnetic pole 24a and correspondingly controls the linear motor to keep the table against overrunning. However, since the opposing end of the field magnet 13 is magnetized with an S-pole 24d, both the limit sensor 35b and the before-the-origin sensor 36 can't respond to the S-pole 24c, but senses for the first time the magnetic pole 24c adjoining to the magnetic pole 24d. As a result, the table 3 comes in deviation from the position where the high propulsion is created on the basis of the interaction of the magnetic flux of the field magnet 13 with the magnetic flux at the coil side 32a of the armature winding 12. This causes a failure in effective control of driving of the table 3. To cope with this, it will be preferable to place both the limit sensor 35b and the before-the-origin sensor 36 in the armature winding 12 nearby the N-pole in the field magnet. Nevertheless, as the armature winding 12 is made much slim or compact in construction, the limit sensor 35b and the before-the-origin sensor 36 are need to be installed outside the armature winding 12.

In accordance with the sliding means 1 of the present invention, the sensor magnet 42 of N-pole is arranged outside the magnetic pole 24d of S-pole in the field magnet 13 in opposition to the limit sensor 35b and the before-the-origin sensor 36. It should be noted that the sensor magnet 42 is made so small in size as to give no effect on the propulsion of the linear motor. The sensor magnet 42 is also made of ferrite magnet that is so weak in magnetic force as to be substantially negligible in influence on the propulsion of the linear motor. Moreover, the sensor magnet 42 requires design considerations of shape and arrangement thereof. That is to say, the sensor magnet 42 is desired to have less overlap with the coil side 32a of the armature winding 12. To deal with this, the sensor magnet 42 is arranged offset sidewise in the direction normal to the moving direction of the table 3 and also made small in length traversing the moving direction. Even if it is much tough to eliminate the overlap of the sensor magnet 42 with the coil side 32a of the armature winding 12, the overlap should be preferably made as reduced as possible. In the embodiment illustrated in FIGS. 4 and 9, the sensor magnet 42 is made substantially equal in width Wbm: Wbm=14.5 mm along the moving direction to a width Wm of the magnetic pole in the field magnet 13, while a length Lbm in the direction normal to the moving direction is made in such extent that permits the limit sensor 35b and the before-the-origin sensor 36 to detect the sensor magnet 42: Lbm=4 mm. It is preferable that the length Lbm of the sensor magnet 42 is less than a half the width-wise length Lam of the field magnet 13. In the meantime the table 3 is designed to have the fore-and-aft length Lt in which the field magnet having five magnetic poles disclosed in Japanese co-pending senior patent application No. 2000-166398 may be also accommodated. Thus, the table 3 affords to ensure the space for the sensor magnet 42 outside the forward and aft ends of the field magnet 13.

The operation of the sliding means 1 will be explained with reference to FIGS. 15 to 17.

Figure 15:
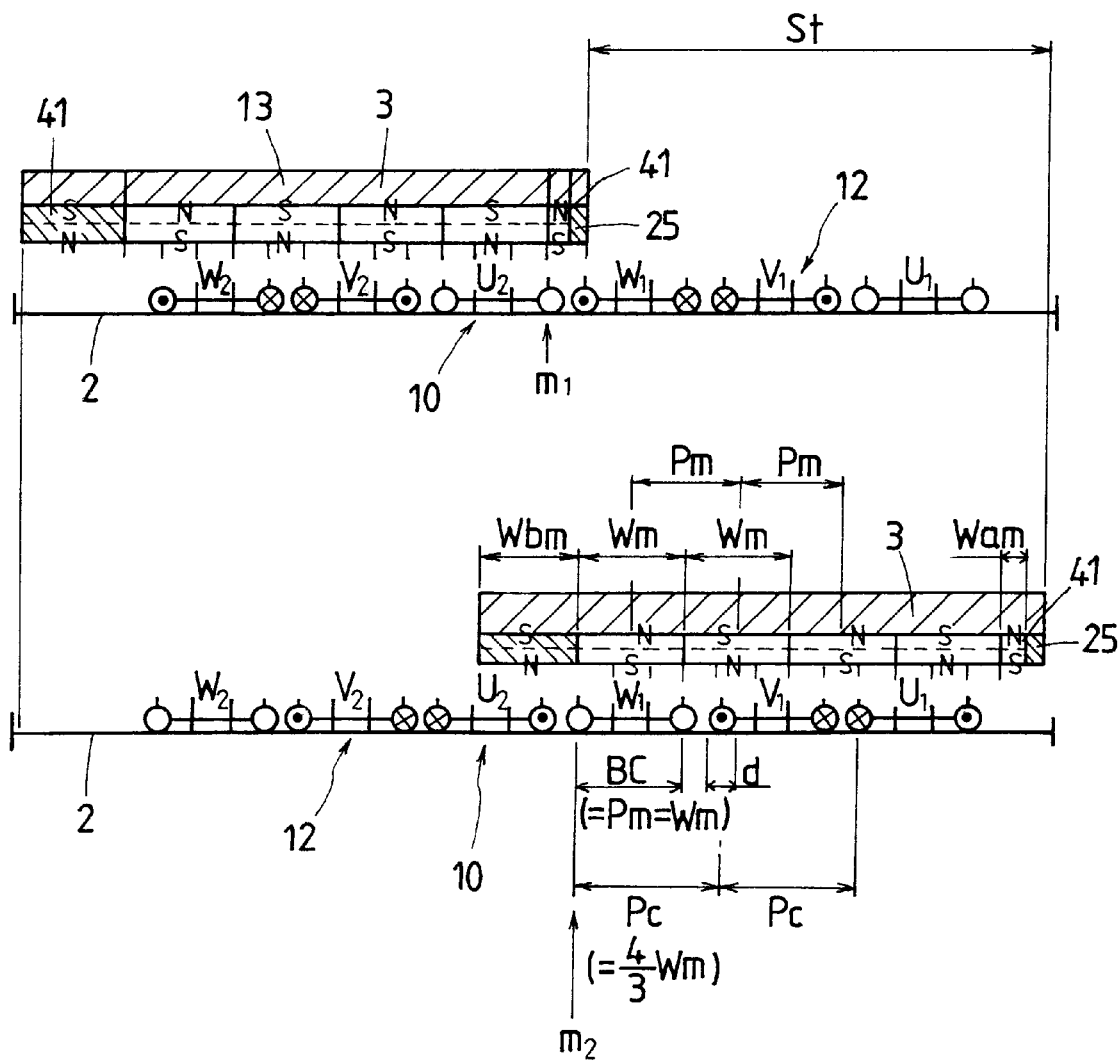
FIG. 15 is a schematic view explanatory of the operation of the sliding means according to the present invention.

In FIG. 15, there is shown in the upper part the event where the table 3 is going to move rightwards at the leftmost end of stroke range, while in a lower part another event the table 3 is going to move leftwards at the rightmost end of stroke range. In order to continue keeping the high propulsion of the sliding means 1, the traveling range of the table 3 should be defined such that the trailing end of the field magnet 13 installed on the table 3 is kept in matching with the middle ($m_1$) of the right coil side 32a, viewed in the upper part in FIG. 15, of the three-phase armature winding 12, which comes in confronting the trailing end of the field magnet 13 at the end of the leftward traveling, while the opposing end of the field magnet 13 is kept in matching with the middle ($m_2$) of the left coil side 32a, viewed in the lower part in FIG. 15, of the three-phase armature winding 12, which comes in confronting the opposing end of the field magnet 13 at the end of the rightward traveling. With the construction defined as stated just above, the current in the armature winding 12 is allowed to interact to the full with the magnetic field created in the field magnet 13. This makes it possible to continue keeping the high propulsion on the table 3.

Figure 16:
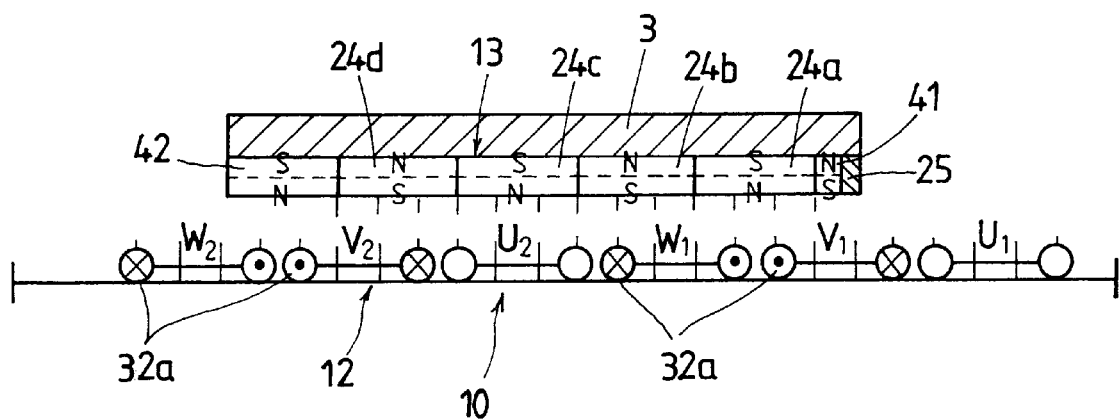
FIG. 16 is a schematic illustration explaining the operation of the sliding means, in which a three-phase current flowing through the armature windings serves to drive the table leftwards at an arbitrary position.
Figure 17:
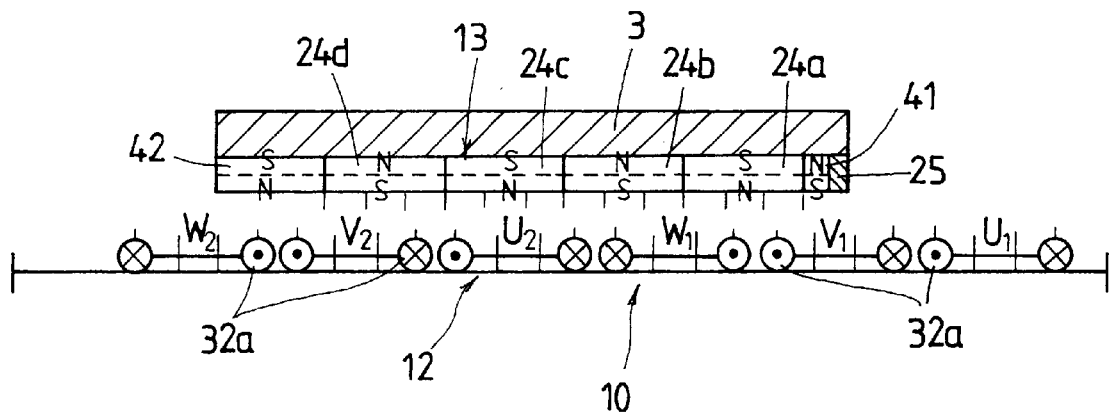
FIG. 17 is a schematic illustration explaining the operation of the sliding means, in which a three-phase current flowing through the armature windings serves to drive the table leftwards at another position.
Figure 18:
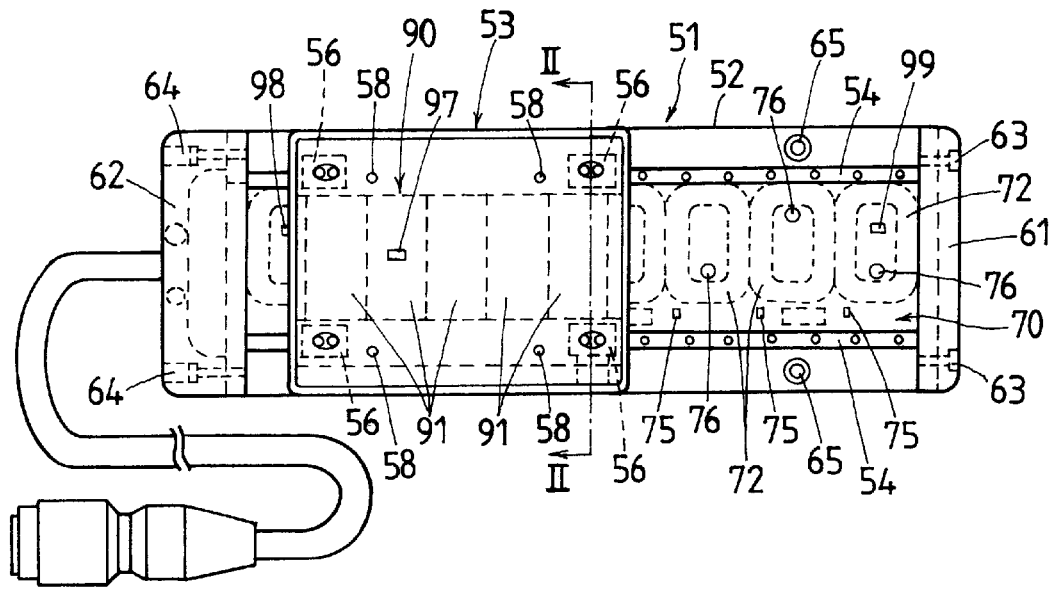
FIG. 18 is a top plan view showing a sliding means with conventional built-in moving-magnet linear motor.
Figure 19:
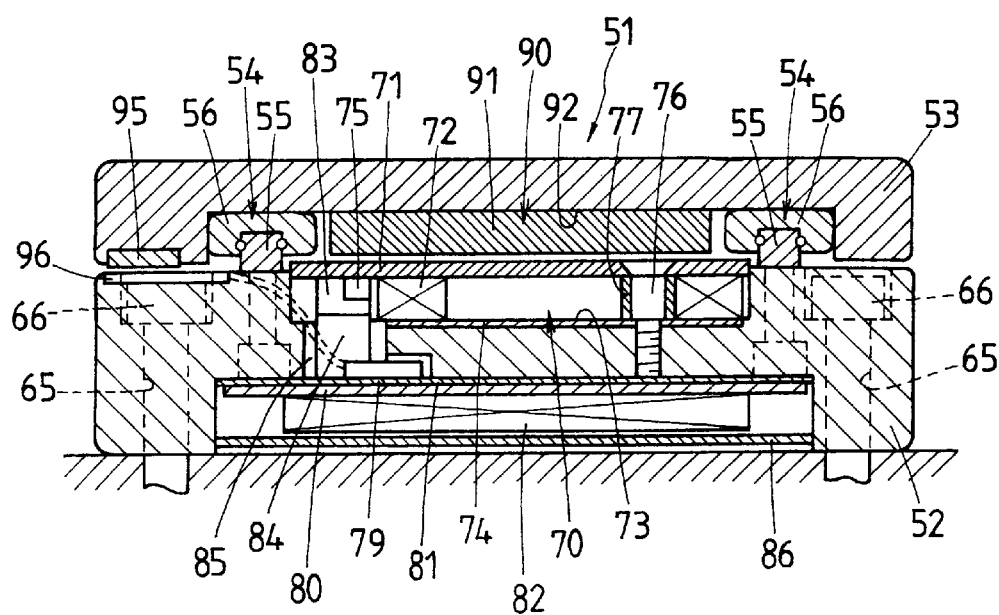
FIG. 19 is a view in section along the plane II—II of FIG. 18 showing the conventional sliding means.

Referring to FIGS. 16 and 17, there are shown the operation of the sliding means, in which a three-phase current flowing through the armature windings 12 serves to drive the table 3 leftwards at an arbitrary position. The current in the armature windings 12 is a three-phase ac current of U-phase, V-phase and W-phase, which are out of phase with each other by 120 degrees as shown in FIG. 10. The current in the armature winding 12 becomes zero when the armature winding is placed at the boundary between the adjacent magnetic poles in the field magnet 13. Although but the current exists in four coil sides 32a of the armature windings 12 in FIG. 16 and in six coil sides 32a in FIG. 17, the linear motor in the present invention is constructed so as to always keep the high propulsion independently of the number of the coil sides 32a in the armature windings 12 carrying the current, because the magnetic flux density increases at the middle of each magnetic pole and the amount of current also varies with the position of the magnetic pole.

Now assuming that the magnetic pole in the field magnet 13 has the width Wm as indicated in FIG. 15, the pole pitch Pm or the distance between the centerlines of adjacent magnetic poles is made identical with the pole width Wm: Pm=Wm, while the distance BC between the centerlines of both coil sides 32a of each armature winding 12 is equal to the pole width Wm: BC=Wm, and the winding pitch Pc or the distance between the adjacent armature windings 12 arranged in juxtaposition is set to four over three of the pole pitch: Pc=4/3 Pm (Pc=4/3 Wm). The length Lam of the field magnet 13 is roughly equal to the distance Lp, refer to FIG. 6, between the middles of the coil ends of the armature winding 12. In accordance with the embodiment stated earlier, for example the pole width Wm is 15 mm, and a stroke St of the table 3 is 65 mm. The sliding means 1 is made 14 mm in height H, refer to FIG. 3, 185 mm in fore-and-aft length L, refer to FIG. 1, and 60 mm in width B, refer to FIG. 1.

With the sliding means 1 according to the present invention, the number of the magnetic poles in the field magnet 13 is an integral multiple of any even number, concretely 4×n wherein n stands for an integer starting from 1) while the number of the armature winding 12 per an armature assembly 10 is an integral multiple of any odd number, concretely 3×(m+1) wherein m stands for an integer starting from 1. Moreover, the number of the armature windings 12: [3×(m+1)] is more and equal to than the number of the magnetic poles in the field magnet 13: (4×n).

What is claimed is:

1. A sliding means with built-in moving-magnet linear motor, comprising a bed and a table constituting paired members arranged for sliding movement relatively of each other, the table being movable lengthwise of the bed in a sliding manner with respect to the bed, a field magnet having unlike magnetic end poles juxtaposed alternately in polarity in a moving direction of the table, an armature winding assembly having armature windings installed on the bed in opposition to the field magnet, a magnetic sensor element installed on the bed in opposition to the field magnet to monitor a strength and direction of magnetic flux, and an auxiliary magnet arranged adjoining to one of the magnetic end poles of the field magnet and magnetized in a polarity opposite to the polarity of the one of the end poles, wherein a current in each armature winding interacts with magnetic flux created by the field magnet to produce an electromagnetic force to apply propulsion to the field magnet to drive the table with a desired position control, and the auxiliary magnet makes up for the magnetic flux at the one of the end poles of the field magnet, thereby making the magnetic sensor element detect an accurate position of the field magnet, wherein the field magnet is made of rare earth magnet and has therein the magnetic poles of a multiple of 4, which are juxtaposed alternately in polarity.

2. A sliding means constructed as recited in claim 1, wherein the auxiliary magnet serves to rectify strength and direction of the magnetic flux outside a boundary of the end pole of the field magnet to the roughly same strength and direction as the magnetic flux found at a boundary between any two adjacent magnetic poles in the field magnet.

3. A sliding means constructed as recited in claim 2, wherein both the bed and the table are made of steel of ferromagnetic material.

4. A sliding means constructed as recited in claim 1, wherein the armature windings are divided into at least two winding groups, each of which includes three armature windings carrying each phase current for three-phase conduction system, and the total number of the armature windings is at least the number of the magnetic poles in the field magnet.

5. A sliding means constructed as recited in claim 4, wherein the field magnet has therein four magnetic poles while there is provided six armature windings and the table has a fore-and-aft length that affords to ensure the space for the five magnetic poles.

6. A sliding means constructed as recited in claim 1, wherein an encoder to monitor a position of the table in the sliding direction with respect to the bed is an optical encode, which is comprised of an optical linear scale arranged on the bed and a sensor installed on the bed in opposition to the optical linear scale to read the optical linear scale.

7. A sliding means constructed as recited in claim 1, wherein the magnetic sensor elements are Hall-effect ICs arranged in the armature windings, each to each winding.

8. A sliding means constructed as recited in claim 1, wherein the armature windings are accommodated in a recess cut in the bed along the sliding direction of the table, and linear motion guide units are interposed between the confronting table and bed and arranged on widthwise opposing sides of the recess along the moving direction of the table.

9. A sliding means constructed as recited in claim 8, wherein the armature windings are mounted on a coil board to cover the recess, so that the armature windings are arranged in a flat form that is fitted snugly in the recess.

10. A sliding means constructed as recited in claim 6, wherein the bed has an end block at any one of the forward and aft ends thereof, and has a connector block at another of the forward and aft ends, the connector block having an electric power cord to be connected to the armature windings and a sensor line to be connected to the sensor element of the encoder, and elastic stoppers are mounted on the blocks, each to each block, to buffer collision with the table.

11. A sliding means with built-in moving-magnet linear motor, comprising a bed and a table constituting paired members arranged for sliding movement relatively of each other, the table being movable lengthwise of the bed in a sliding manner with respect to the bed, a field magnet having unlike magnetic end poles juxtaposed alternately in polarity in a moving direction of the table, an armature winding assembly having armature windings installed on the bed in opposition to the field magnet, a magnetic sensor element installed on the bed in opposition to the field magnet to monitor a strength and direction of magnetic flux, and an auxiliary magnet arranged adjoining to one of the magnetic end poles of the field magnet and magnetized in a polarity opposite to the polarity of the one of the end poles, wherein a current in each armature winding interacts with magnetic flux created by the field magnet to produce an electromagnetic force to apply propulsion to the field magnet to drive the table with a desired position control, and the auxiliary magnet makes up for the magnetic flux at the one of the end poles of the field magnet, thereby making the magnetic sensor element detect an accurate position of the field magnet, wherein the auxiliary magnet is made less in width in the sliding direction than a width of a coil side of the armature winding to reduce any effect on propulsion rendered to the table.

12. A sliding means with built-in moving-magnet linear motor, comprising a bed and a table constituting paired members arranged for sliding movement relatively of each other, the table being movable lengthwise of the bed in a sliding manner with respect to the bed, a field magnet having unlike magnetic end poles juxtaposed alternately in polarity in a moving direction of the table, an armature winding assembly having armature windings installed on the bed in opposition to the field magnet, a magnetic sensor element installed on the bed in opposition to the field magnet to monitor a strength and direction of magnetic flux, and an auxiliary magnet arranged adjoining to one of the magnetic end poles of the field magnet and magnetized in a polarity opposite to the polarity of the one of the end poles, wherein a current in each armature winding interacts with magnetic flux created by the field magnet to produce an electromagnetic force to apply propulsion to the field magnet to drive the table with a desired position control, and the auxiliary magnet makes up for the magnetic flux at the one of the end poles of the field magnet, thereby making the magnetic sensor element detect an accurate position of the field magnet, wherein the table is provided with an origin mark to define an origin of the table, and a sensor magnet arranged adjoining to the magnetic end pole fore-and-aft opposite to the auxiliary magnet and magnetized in a polarity unlike the associated magnetic end pole, while the bed is provided with an origin sensor to detect the origin mark, and the armature winding assembly is mounted with a before-the-origin sensor to respond to the sensor magnet at a before-the-origin position just before the origin sensor detects the origin during a linear movement of the table along the bed, and a limit sensor to respond any one of the magnetic end poles and the sensor magnet when the table reaches any dead end position of a tolerated stroke range.

13. A sliding means constructed as recited in claim 12, wherein the sensor magnet is arranged outside the field magnet and made less than and equal in length to a half the field magnet to reduce the effect on the propulsion exerted on the field magnet.

14. A sliding means constructed as recited in claim 13, wherein the sensor magnet is made of ferrite magnet.

15. A sliding means constructed as recited in claim 12, wherein the auxiliary magnet is magnetized in S-pole, the magnetic pole adjacent to the auxiliary magnet is in N-pole, while the sensor magnet is magnetized in N-pole and the magnetic pole adjoining to the sensor magnet is magnetized in S-pole.

16. A sliding means with built-in moving-magnet linear motor, comprising a bed and a table constituting paired members arranged for sliding movement relatively of each other, the table being movable lengthwise of the bed in a sliding manner with respect to the bed, a field magnet having unlike magnetic end poles juxtaposed alternately in polarity in a moving direction of the table, an armature winding assembly having armature windings installed on the bed in opposition to the field magnet, a magnetic sensor element installed on the bed in opposition to the field magnet to monitor a strength and direction of magnetic flux, and an auxiliary magnet arranged adjoining to one of the magnetic end poles of the field magnet and magnetized in a polarity opposite to the polarity of the one of the end poles, wherein a current in each armature winding interacts with magnetic flux created by the field magnet to produce an electromagnetic force to apply propulsion to the field magnet to drive the table with a desired position control, and the auxiliary magnet makes up for the magnetic flux at the one of the end poles of the field magnet, thereby making the magnetic sensor element detect an accurate position of the field magnet, wherein the table is provided with an end plate at a position adjoining the auxiliary magnet to keep the magnetic flux established in the field magnet against leakage.

* * * * *